(12) United States Patent
Tanaka et al.

(10) Patent No.: US 11,428,185 B2
(45) Date of Patent: Aug. 30, 2022

(54) CONTROL DEVICE FOR INTERNAL COMBUSTION ENGINE AND CONTROL PROGRAM THEREFOR

(71) Applicant: Mitsubishi Electric Corporation, Tokyo (JP)

(72) Inventors: Yoku Tanaka, Tokyo (JP); Takeshi Kitao, Hyogo (JP); Tomokazu Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 216 days.

(21) Appl. No.: 16/943,696

(22) Filed: Jul. 30, 2020

(65) Prior Publication Data

US 2021/0102510 A1 Apr. 8, 2021

(30) Foreign Application Priority Data

Oct. 2, 2019 (JP) .............................. JP2019-181778

(51) Int. Cl.
| | |
|---|---|
| *F02D 45/00* | (2006.01) |
| *G05B 13/02* | (2006.01) |
| *F02D 41/14* | (2006.01) |
| *F02D 41/26* | (2006.01) |
| *G05B 15/02* | (2006.01) |
| *G06N 3/08* | (2006.01) |
| *F02D 41/24* | (2006.01) |

(52) U.S. Cl.
CPC .......... *F02D 41/26* (2013.01); *F02D 41/2438* (2013.01); *G05B 15/02* (2013.01); *G06N 3/08* (2013.01)

(58) Field of Classification Search
CPC .... F02D 41/26; F02D 41/266; F02D 41/1401; F02D 41/1405; F02D 41/2438; G05B 15/02; G06N 3/08; G06N 3/084
See application file for complete search history.

(56) References Cited

U.S. PATENT DOCUMENTS

2020/0125042 A1* 4/2020 Oyagi .................. G05B 13/027
2020/0134452 A1* 4/2020 Kobuna ................ G08G 1/143
(Continued)

FOREIGN PATENT DOCUMENTS

JP 11-343916 A 12/1999

*Primary Examiner* — Phutthiwat Wongwian
*Assistant Examiner* — Arnold Castro
(74) *Attorney, Agent, or Firm* — Sughrue Mion, PLLC; Richard C. Turner

(57) ABSTRACT

A control device for an internal combustion engine includes an information acquirer, a first computing unit, and a second computing unit. The information acquirer acquires information on a state amount that changes depending on the operation state of the internal combustion engine. A region determiner determines whether the state amount falls within a set region. The first computing unit uses an in-region state amount within the set region, as an input value to compute a control amount of the internal combustion engine by a neural network. The second computing unit selects a reference state amount within the set region, based on the out-of-region state amount, uses the selected reference state amount as an input value to compute a reference control amount by the neural network, and computes the control amount corresponding to the out-of-region state amount based on the computed reference control amount.

12 Claims, 14 Drawing Sheets

(56) References Cited

U.S. PATENT DOCUMENTS

| | | | |
|---|---|---|---|
| 2020/0248641 A1* | 8/2020 | Nakamura | F02D 41/2451 |
| 2021/0062744 A1* | 3/2021 | Charbonnel | F02D 41/2467 |
| 2021/0088020 A1* | 3/2021 | Mori | F02P 5/152 |
| 2021/0088021 A1* | 3/2021 | Mori | G06N 3/088 |

* cited by examiner

CONTROL DEVICE FOR INTERNAL COMBUSTION ENGINE AND CONTROL PROGRAM THEREFOR

BACKGROUND OF THE INVENTION

1. Field of the Invention

The present invention relates to: a control device for an internal combustion engine, which is configured to compute a control amount for controlling the internal combustion engine based on a state amount that changes depending on the operation state of the internal combustion engine; and a control program therefor.

2. Description of the Related Art

In recent years, there have been increasing demands for improvement in fuel efficiency and reduction in emissions of an internal combustion engine. Therefore, there has been an increasing demand for more precise control of the internal combustion engine. In order to precisely control the internal combustion engine, it is required to compute a control amount in consideration of a larger number of state amounts of the internal combustion engine.

In a related-art data estimation method for engine control, a fuzzy neural network is used to estimate data on a control parameter representing the state of an engine. At this time, the fuzzy neural network receives input of data on a plurality of kinds of control parameters different from the data on the control parameter to be estimated (see, for example, Japanese Patent Application Laid-open No. Hei 11-343916). That is, in the related-art data estimation method, a plurality of state amounts of the internal combustion engine are input to the fuzzy neural network, to thereby compute the control amount of the internal combustion engine.

In order to cause the fuzzy neural network to perform learning with high accuracy, it is required to provide a sufficient number of pieces of training data. However, according to the related-art data estimation method described above, the number of pieces of training data to be input to the fuzzy neural network at the time of learning is not taken into consideration, which leads to a fear that the training data may become insufficient near the performance limit of the internal combustion engine due to the following reason.

The phrase "near the performance limit of the internal combustion engine" refers to, for example, a case in which an engine speed is extremely high, a case in which a coolant temperature is extremely high, or a case in which the opening and closing timing of an intake valve is greatly advanced or retarded. The training data is a combination of the state amount and the control amount of the internal combustion engine that are obtained as a result of an operation test or simulation of the internal combustion engine. Examples of the state amount of the training data include the engine speed, an intake air temperature, and the opening and closing timings of intake and exhaust valves, and examples of the control amount for those state amounts include an intake air amount.

Near the performance limit of the internal combustion engine, the combustion of an air-fuel mixture in a cylinder becomes unstable, and the performance of the internal combustion engine may fail to be fully exhibited. Therefore, in this case, the control amount of the internal combustion engine with respect to the state amount representing the operation state of the internal combustion engine may fail to be accurately measured. A measurement result relating to the control amount that is not accurately measured cannot be used as the training data for the fuzzy neural network. This is the reason why the training data becomes insufficient near the performance limit of the internal combustion engine.

The accuracy of the learning using the fuzzy neural network tends to become lower as the number of pieces of training data becomes smaller, which leads to a fear that the accuracy of the learning near the performance limit of the internal combustion engine may deteriorate. Therefore, there arises a fear that the control accuracy of the internal combustion engine may deteriorate.

SUMMARY OF THE INVENTION

The present invention has been made in order to solve the above-mentioned problem, and has an object to provide: a control device for an internal combustion engine, which is capable of suppressing deterioration in control accuracy of the internal combustion engine; and a control program therefor.

According to at least one embodiment, there is provided a control device for an internal combustion engine, the control device including: an information acquirer configured to acquire, from a state amount sensor, information on a state amount that changes depending on an operation state of the internal combustion engine; and a computing unit configured to compute at least one control amount for controlling the internal combustion engine based on the information acquired by the information acquirer, the computing unit including: a region determiner configured to determine whether the state amount falls within a set region; a first computing unit configured to use at least one in-region state amount, which is the state amount determined to fall within the set region, as an input value to compute the at least one control amount by a neural network; and a second computing unit configured to use at least one out-of-region state amount, which is the state amount determined to fall out of the set region, as an input value to compute the at least one control amount, and the second computing unit being configured to: select at least one reference state amount, which is the state amount that falls within the set region, based on the at least one out-of-region state amount; use the at least one reference state amount as an input value to compute at least one reference control amount by the neural network; and compute the at least one control amount corresponding to the at least one out-of-region state amount based on the at least one reference control amount.

With the control device for the internal combustion engine and the control program therefor according to the present invention, it is possible to suppress the deterioration in control accuracy of the internal combustion engine.

DESCRIPTION OF THE EMBODIMENTS

Now, embodiments are described with reference to the drawings. In the following description, like components are denoted by like reference symbols.

First Embodiment

Figure 1:
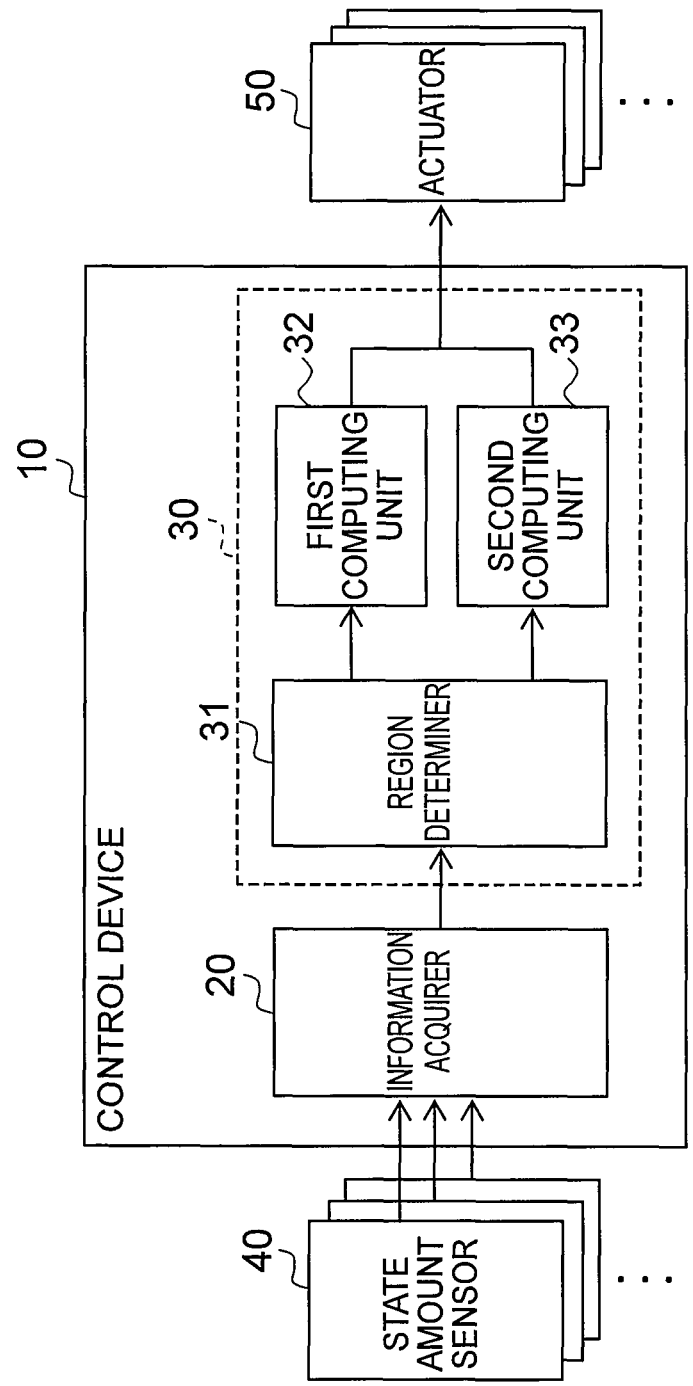
FIG. 1 is a configuration diagram for illustrating a control device for an internal combustion engine according to a first embodiment.

FIG. 1 is a configuration diagram for illustrating a control device for an internal combustion engine according to a first embodiment. As illustrated in FIG. 1, a control device 10 for the internal combustion engine according to the first embodiment includes an information acquirer 20 and a computing unit 30 as functional blocks. The information acquirer 20 acquires, from a state amount sensor 40, information on a state amount that changes depending on the operation state of the internal combustion engine.

Examples of the state amount sensor 40 include a crank angle sensor, an air flow meter, an intake air temperature sensor, a water temperature sensor, and an air-fuel ratio sensor. The crank angle sensor detects the rotation angle of a crankshaft of the internal combustion engine. The air flow meter is provided to an intake passage of the internal combustion engine, and detects an intake air amount. The intake air temperature sensor is provided to the intake passage, and detects the temperature of intake air. The water temperature sensor is provided to a cylinder block of the internal combustion engine, and detects the temperature of a coolant. The air-fuel ratio sensor is provided to an exhaust passage of the internal combustion engine, and detects the air-fuel ratio of exhaust gas.

The computing unit 30 computes a control amount for controlling the internal combustion engine based on the information acquired by the information acquirer 20. In this case, the control amount for controlling the internal combustion engine corresponds to the control amount of at least one actuator 50 of a plurality of actuators 50. Those actuators 50 are provided to the internal combustion engine. Examples of the actuator 50 include a fuel injection valve, an ignition device, a variable valve timing mechanism, and a throttle motor.

Figure 2:
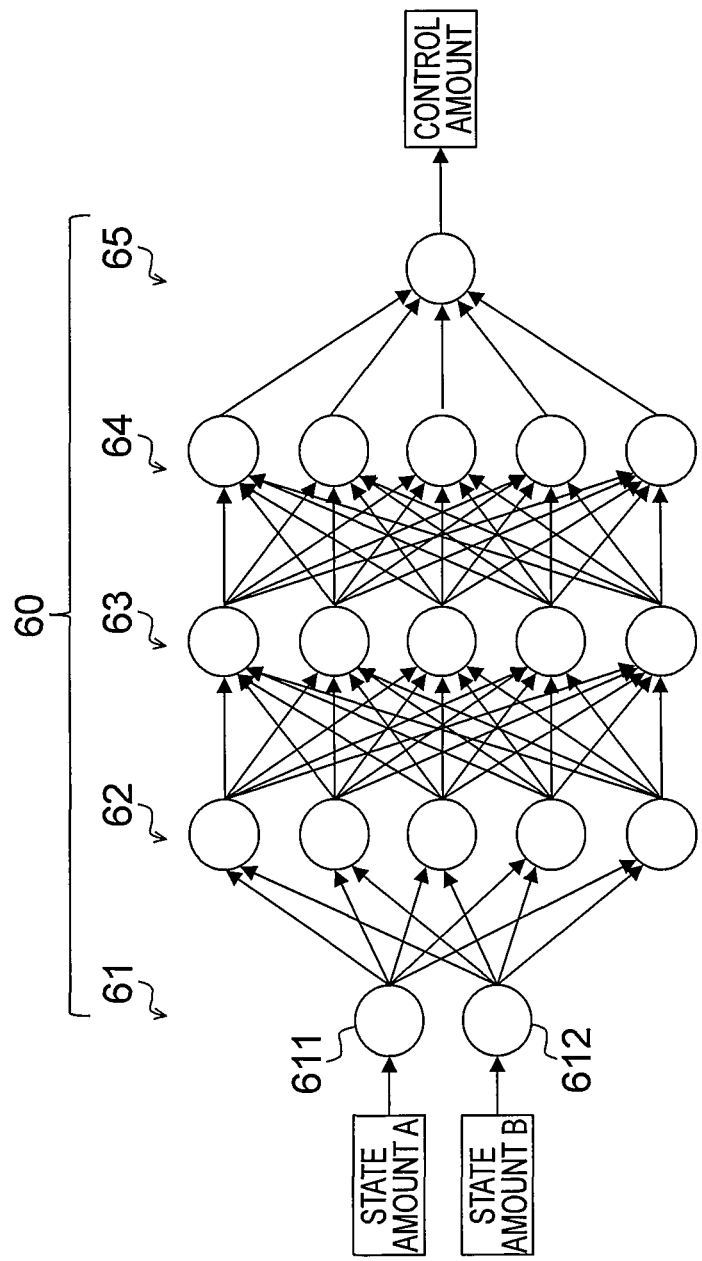
FIG. 2 is a configuration diagram for illustrating a neural network to be used by a computing unit illustrated in FIG. 1.

Next, a description is given of a neural network to be used by the computing unit 30 and a learning method of the neural network. FIG. 2 is a configuration diagram for illustrating a neural network to be used by the computing unit 30. A neural network 60 is formed of a known feedforward neural network. The neural network 60 is hereinafter abbreviated as "NN 60".

As illustrated in FIG. 2, the NN 60 includes an input layer 61, a first intermediate layer 62, a second intermediate layer 63, a third intermediate layer 64, and an output layer 65. The NN 60 has a structure in which units included in those respective layers are coupled to each other between adjacent layers. In the NN 60, information input to the input layer propagates in one direction through a plurality of units toward the output layer. In general, those units may also be expressed as nodes or neurons.

The input layer 61 includes two units 611 and 612 corresponding to a state amount A and a state amount B, respectively. The first intermediate layer 62, the second intermediate layer 63, and the third intermediate layer 64 each include five units.

One unit included in the first intermediate layer 62 to the third intermediate layer 64 performs processing for multiplying values output from all the units existing immediately before the one unit's own layer by a weighting factor and adding a bias thereto. The unit substitutes all those processed values into an activation function expressed by a nonlinear function or an identity function, and outputs an obtained value.

When the NN 60 is caused to perform learning, a large number of combinations of the state amount and the control amount of the internal combustion engine that are obtained as a result of an operation test or simulation of the internal combustion engine are provided in advance as pieces of training data. The obtained state amount of the internal combustion engine corresponds to input data for the NN 60, and is referred to as "training input data" in the following description. The obtained control amount of the internal combustion engine corresponds to output data for the NN 60, and is referred to as "training output data" in the following description.

Figure 3:
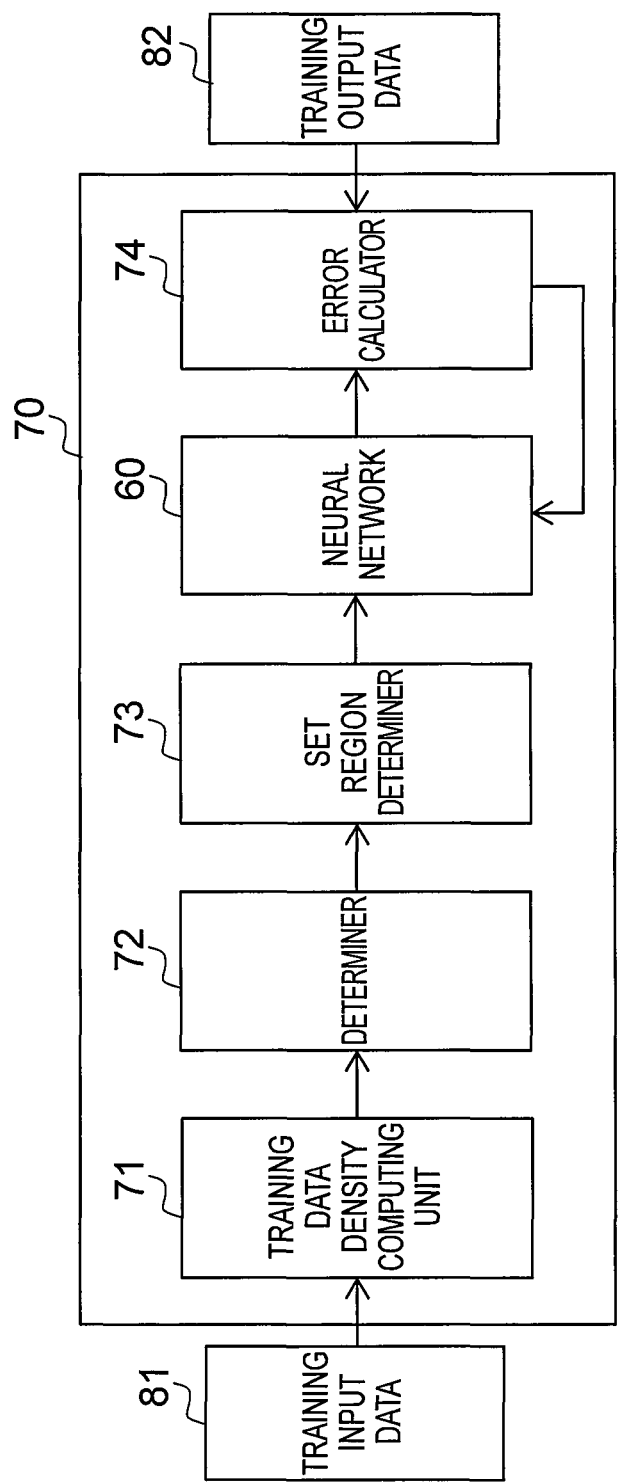
FIG. 3 is a configuration diagram for illustrating a learning device configured to cause the neural network illustrated in FIG. 2 to perform learning.

FIG. 3 is a configuration diagram for illustrating a learning device configured to cause the NN 60 to perform learning. As illustrated in FIG. 3, a learning device 70 includes a training data density computing unit 71, a density determiner 72, a set region determiner 73, the NN 60, and an error calculator 74.

Figure 4:
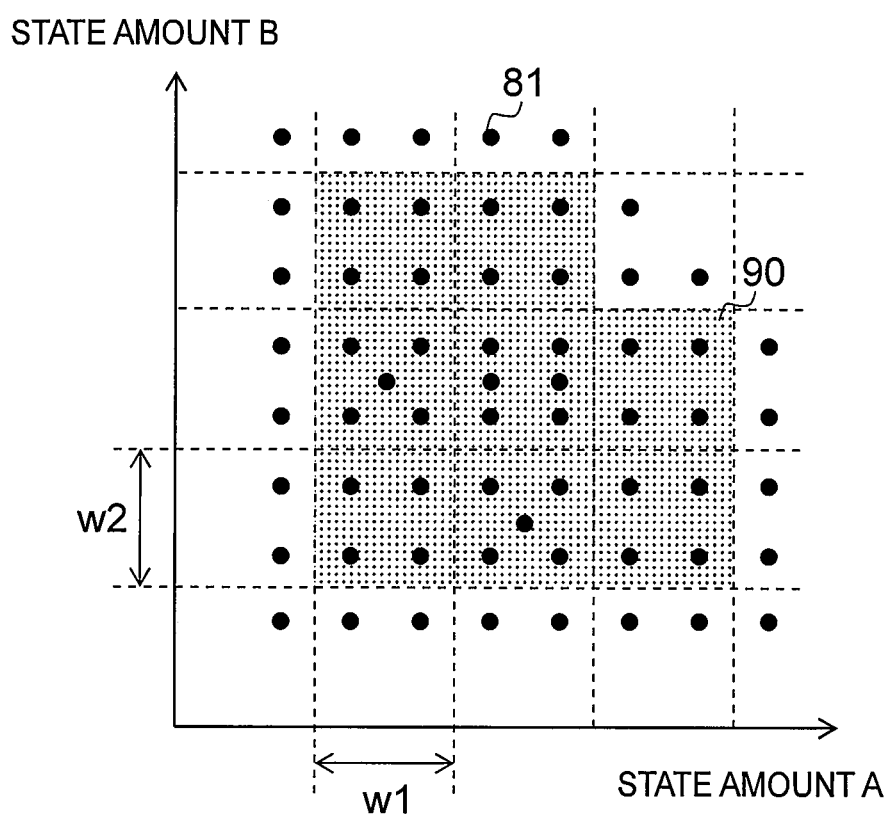
FIG. 4 is a graph for showing an operation of the learning device illustrated in FIG. 3.

The training data density computing unit 71 receives input of training input data 81. Now, consideration is given to a case in which, as shown in FIG. 4, the training input data 81 is distributed as indicated by the black circles in a two-dimensional space having the horizontal axis representing the state amount A and the vertical axis representing the state amount B.

The training data density computing unit 71 divides this two-dimensional space into a plurality of reference small ranges. The reference small ranges are each a rectangular range having a horizontal width of w1 and a vertical width of w2. The horizontal width w1 and the vertical width w2 are set to fixed values in advance. The training data density computing unit 71 detects the number of pieces of training input data 81 present in each of the reference small ranges, that is, a training data density TD.

Subsequently, the density determiner 72 determines whether each training data density TD is equal to or higher than a reference density Tst. In the example shown in FIG. 4, the reference density Tst is 4.

The set region determiner 73 determines, as a set region 90, a set of reference small ranges determined to have the training data density TD equal to or higher than the reference density Tst based on a determination result obtained by the density determiner 72. The set region 90 is thus set as a region in which the training data density TD of the presence of the training input data 81 to be used for the learning by the NN 60 is equal to or higher than the reference density Tst in an n-dimensional space having the coordinate axes representing state amounts, where n represents a positive integer. Then, the set region determiner 73 outputs, to the NN 60, the "training input data determined to fall within the set region 90", namely, "in-region state amount".

In the NN 60, the in-region state amount is input to the input layer 61, computation is performed in the respective units, and then the computed control amount is output from the output layer 65 to the error calculator 74. The error calculator 74 receives input of the control amount computed in the NN 60 and input of training output data 82. The error calculator 74 uses an error function to calculate an error between the computed control amount and the training output data 82. The error calculator 74 feeds back the above-mentioned error to the NN 60. The NN 60 adjusts the weighting factor and the bias for each unit of the NN 60 so as to minimize the value of the error function. This adjustment method is known as an error back propagation method.

The learning device 70 creates, based on the above-mentioned result, a lookup table that defines a relationship between the state amount A and state amount B and the set region 90, and stores the lookup table in a memory (not shown) included in the computing unit 30.

Referring back to FIG. 1, an operation of the computing unit 30 is described. The computing unit 30 includes a region determiner 31, a first computing unit 32, and a second computing unit 33.

The region determiner 31 refers to the lookup table that defines the relationship between the state amount A and state amount B and the set region 90 to determine whether the input state amount falls within the set region 90. When determining that the input state amount falls within the set region 90, the region determiner 31 outputs the state amount to the first computing unit 32. Meanwhile, when determining that the input state amount does not fall within the set region 90, that is, falls out of the set region 90, the region determiner 31 outputs the state amount to the second computing unit 33.

The first computing unit 32 uses the in-region state amount, which is the state amount determined to fall within the set region 90, as an input value to compute the control amount of the internal combustion engine by the NN 60. Then, the first computing unit 32 outputs the computed control amount to the actuator 50 of the internal combustion engine.

The second computing unit 33 uses an out-of-region state amount, which is the state amount determined to fall out of the set region 90, as an input value to compute the control amount of the internal combustion engine. More specifically, the second computing unit 33 sequentially executes the following three computations.

(1) The second computing unit 33 selects a reference state amount, which is the state amount that falls within the set region 90, based on the out-of-region state amount. In other words, the second computing unit 33 selects, from among in-region state amounts, at least one state amount as the reference state amount based on the out-of-region state amount.

(2) The second computing unit 33 uses the selected reference state amount as an input value to compute a reference control amount by the NN 60.

(3) The second computing unit 33 computes a control amount corresponding to the out-of-region state amount based on the computed reference control amount.

Then, the first computing unit 32 and the second computing unit 33 each output a result of the computation to the actuator 50 of the internal combustion engine.

Figure 5:
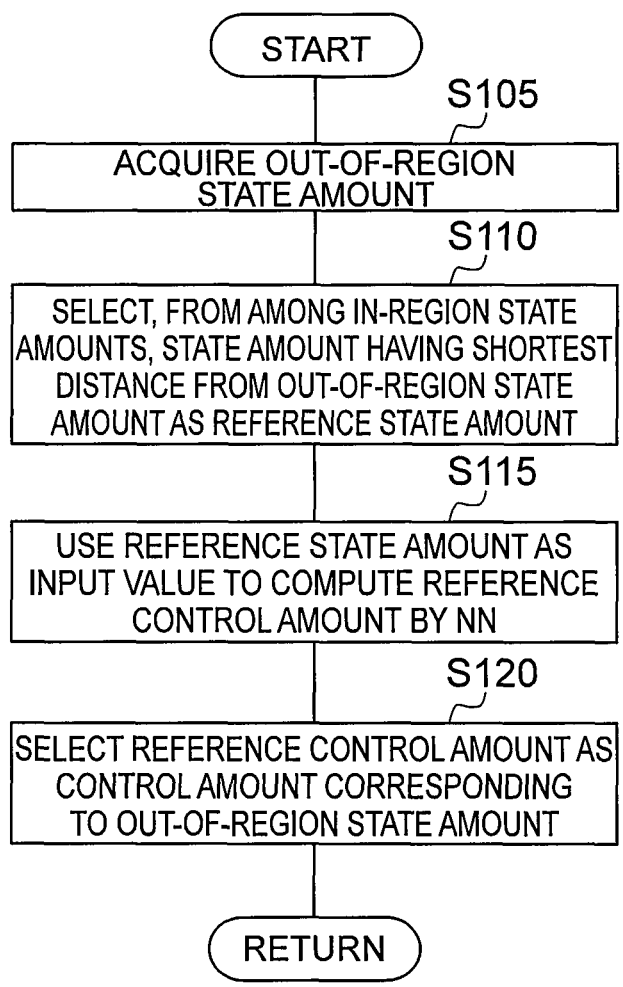
FIG. 5 is a flow chart for illustrating a control amount computation routine to be executed by the control device illustrated in FIG. 1.

Next, an operation of the second computing unit 33 is described in more detail. FIG. 5 is a flow chart for illustrating a control amount computation routine to be executed by the second computing unit 33. The routine illustrated in FIG. 5 is executed each time the region determiner 31 determines that the input state amount is an out-of-region state amount.

After starting the routine illustrated in FIG. 5, the second computing unit 33 first acquires an out-of-region state amount in Step S105. Subsequently, in Step S110, the second computing unit 33 selects a state amount closest to the acquired out-of-region state amount as a reference state amount. In other words, in an n-dimensional space having the coordinate axes representing the state amounts, the second computing unit 33 selects, from among the in-region state amounts, a state amount having the shortest distance from the out-of-region state amount as the reference state amount.

Figure 6:
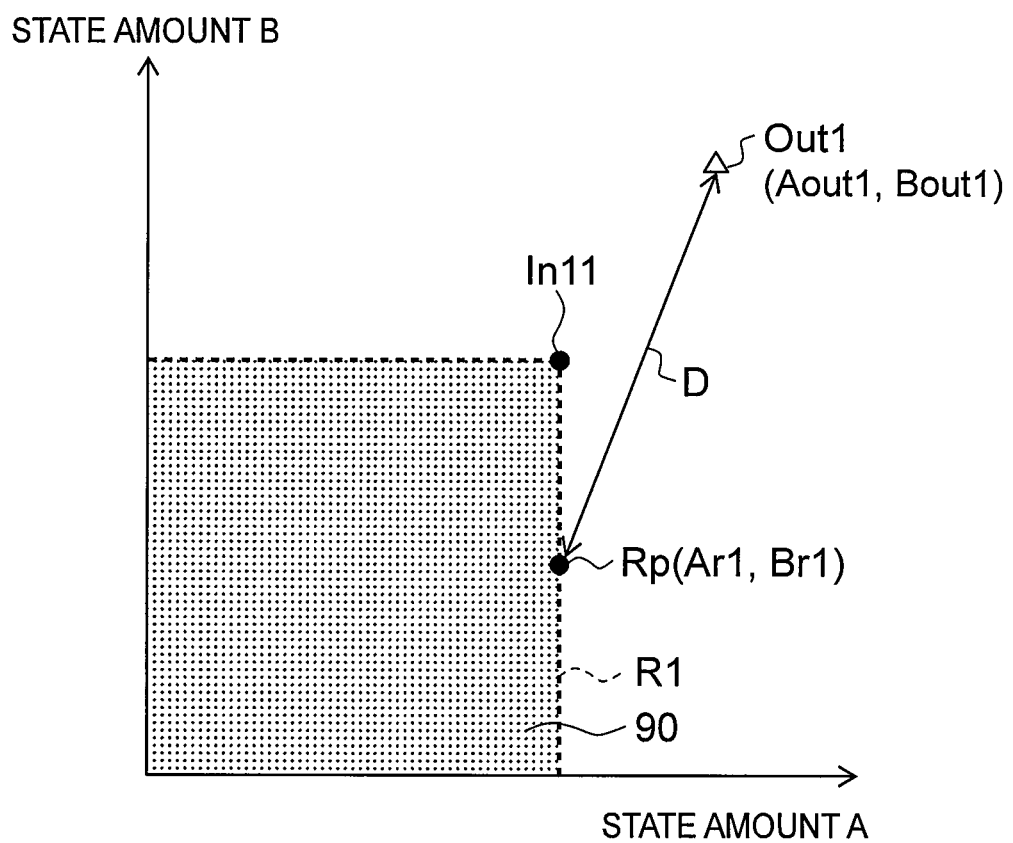
FIG. 6 is a graph for showing an operation of the control device illustrated in FIG. 1.

FIG. 6 is a graph for showing a relationship between a set region and an out-of-region state amount in the two-dimensional space having the horizontal axis representing the state amount A and the vertical axis representing the state amount B. In FIG. 6, a boundary R1 of the set region 90 is indicated by the broken line. A point Rp on the boundary R1 represents one of the in-region state amounts. A point Out1 outside the set region 90 represents the input out-of-region state amount. As can be understood from FIG. 6, among the points within the set region 90, a point having the shortest distance from the point Out1 is present on the boundary R1.

When the coordinates of the point Rp in the two-dimensional space are represented by (Ar1, Br1) and the coordinates of the point Out1 in the two-dimensional space are represented by (Aout1, Bout1), a distance D between the point Rp and the point Out1 is expressed by Expression (1).

$$D=\sqrt{(A_{out1}-A_{r1})^2+(B_{out1}-B_{r1})^2} \quad (1)$$

Incidentally, the magnitude of the range of values that can be taken by the state amount A is often different from the magnitude of the range of values that can be taken by the state amount B. For example, when the state amount A has a value much larger than that of the state amount B, the state amount A exerts more influences on the distance D. In other words, in this case, the distance D is more sensitive to a change in value Ar1. In view of this, the components (Aout1-Ar1) and (Bout1-Br1) parallel to the respective coordinate axes in Expression (1) are normalized through use of a difference value between the maximum value and the minimum value that can be taken by each state amount. This normalized distance D is hereinafter defined as "Euclidean distance Deu".

When the maximum value of the state amount A is represented by Amax, the minimum value of the state amount A is represented by Amin, the maximum value of the state amount B is represented by Bmax, and the minimum value of the state amount B is represented by Bmin, the Euclidean distance Deu between the point Out1 and the point Rp is expressed by Expression (2).

$$D_{eu} = \sqrt{\left(\frac{A_{out1} - A_{r1}}{A_{max} - A_{min}}\right)^2 + \left(\frac{B_{out1} - B_{r1}}{B_{max} - B_{min}}\right)^2} \quad (2)$$

The second computing unit 33 determines the values Ar1 and Br1 so as to minimize the Euclidean distance Deu. In this case, the coordinates (Ar1, Br1) coincide with the coordinates of an in-region state amount In11 located at a vertex of the boundary R1. In short, the second computing unit 33 selects the in-region state amount In11 as the reference state amount. The second computing unit 33 uses, for example, a local search method to determine the values Ar1 and Br1.

In the local search method, a set N(x) of solutions obtained by performing an operation for adding small corrections to a given solution x is referred to as "neighborhood". The local search method is a method of starting from a suitable initial solution and repeating an operation for replacing x by x' as many times as possible when a solution x' more satisfactory than the current solution x is present in the neighborhood N(x). The local search is finished when there is no more satisfactory solution left in the neighborhood N(x). Such a local search method is publicly known, and hence a detailed description thereof is omitted.

Subsequently, in Step S115, the second computing unit 33 uses the reference state amount In11 as an input value to compute a reference control amount NNo11 by the NN 60. That is, the reference control amount NNo11 is the output obtained when the selected reference state amount is input to the NN 60.

Subsequently, in Step S120, the second computing unit 33 outputs the computed reference control amount as it is as the control amount corresponding to the out-of-region state amount. The reason for this processing is as follows.

The control amount of the internal combustion engine generally has a non-linear relationship with the state amount. That is, the degree of change in control amount differs depending on the magnitude of the state amount. However, control amounts corresponding to two state amounts that are close to each other tend to have values relatively close to each other. Therefore, the control amount corresponding to the out-of-region state amount can be approximated by the control amount corresponding to the in-region state amount present in the neighborhood of the out-of-region state amount.

In this manner, the reference control amount NNo11 corresponding to the reference state amount In11 having the shortest Euclidean distance Deu is estimated to be an amount close to a control amount corresponding to the out-of-region state amount Out1.

As described above, a control method for the internal combustion engine in the first embodiment includes an information acquisition step and a computation step. The computation step includes a region determination step, a first computation step, and a second computation step.

The information acquisition step is the step of acquiring, from the state amount sensor 40, information on a state amount that changes depending on the operation state of an internal combustion engine. The computation step is the step of computing a control amount for controlling the internal combustion engine based on the information acquired in the information acquisition step. The region determination step is the step of determining whether the state amount falls within a set region. The first computation step is the step of using an in-region state amount, which is the state amount determined to fall within the set region, as an input value to compute the control amount by a neural network. The second computation step is the step of using an out-of-region state amount, which is the state amount determined to fall out of the set region, as an input value to compute the control amount.

The second computation step further includes the following first to third steps. The first step is the step of selecting a reference state amount, which is the state amount that falls within the set region, based on the out-of-region state amount. The second step is the step of using the reference state amount as an input value to compute a reference control amount by the neural network. The third step is the step of computing a control amount corresponding to the out-of-region state amount based on the reference control amount.

Further, a control program for the internal combustion engine according to the first embodiment is a program for causing a computer to execute the above-mentioned control method for the internal combustion engine.

That is, the control program for the internal combustion engine is a program for causing a computer to execute information acquisition processing and computation processing. The computation processing includes region determination processing, first computation processing, and second computation processing.

The information acquisition processing is the processing of acquiring, from the state amount sensor 40, information on a state amount that changes depending on the operation state of an internal combustion engine. The computation processing is the processing of computing a control amount for controlling the internal combustion engine based on the information acquired in the information acquisition processing. The region determination processing is the processing of determining whether the state amount falls within a set region. The first computation processing is the processing of using an in-region state amount, which is the state amount determined to fall within the set region, as an input value to compute the control amount by a neural network. The second computation processing is the processing of using an out-of-region state amount, which is the state amount determined to fall out of the set region, as an input value to compute the control amount.

The second computation processing further includes the following first to third processing. The first processing is the processing of selecting a reference state amount, which is the state amount that falls within the set region, based on the out-of-region state amount. The second processing is the processing of using the reference state amount as an input value to compute a reference control amount by the neural network. The third processing is the processing of computing a control amount corresponding to the out-of-region state amount based on the reference control amount.

As described above, with the control device 10 for the internal combustion engine and the control program therefor according to the first embodiment, it is possible to suppress the deterioration in control accuracy of the internal combustion engine.

Further, the second computing unit 33 is configured to select the state amount closest to the out-of-region state amount Out1 as the reference state amount. Therefore, it is possible to further suppress the deterioration in control accuracy of the internal combustion engine.

Further, the second computing unit 33 is configured to select, from among in-region state amounts, a state amount having a shortest distance from the out-of-region state amount Out1 as the reference state amount in a two-dimensional space having coordinate axes each representing the state amount A and the state amount B. Therefore, it is possible to further suppress the deterioration in control accuracy of the internal combustion engine.

Further, the second computing unit 33 is configured to output the reference control amount as it is as the control amount corresponding to the out-of-region state amount Out1. Therefore, it is possible to suppress the deterioration in control accuracy of the internal combustion engine by a simple method.

Further, the set region 90 is set as a region in which the training data density TD to be used for learning by the NN 60 is equal to or higher than a reference density in a two-dimensional space having coordinate axes each representing the state amount A and the state amount B. Therefore, it is possible to cause the NN 60 to perform learning with high accuracy.

Second Embodiment

Next, a description is given of a control device for an internal combustion engine according to a second embodiment. The control device for the internal combustion engine according to the second embodiment is different from the control device 10 for the internal combustion engine according to the first embodiment in that the second computing unit 33 computes a control amount corresponding to the out-of-region state amount Out1 from one approximate function for a plurality of reference control amounts.

In the control device for the internal combustion engine according to the second embodiment, the second computing unit 33 computes a linear function that passes through the out-of-region state amount and a specific state amount among the in-region state amounts. The second computing unit 33 then selects, as reference state amounts, the specific state amount and a state amount on the linear function other than the specific state amount. The second computing unit 33 further uses the specific state amount and the state amount on the linear function other than the specific state amount as input values to compute reference control amounts by the NN 60. Subsequently, the second computing unit 33 computes an approximate function being a function for approximating the reference control amounts. Then, the second computing unit 33 substitutes the out-of-region state amount into the approximate function, to thereby compute a control amount corresponding to the out-of-region state amount.

Figure 7:
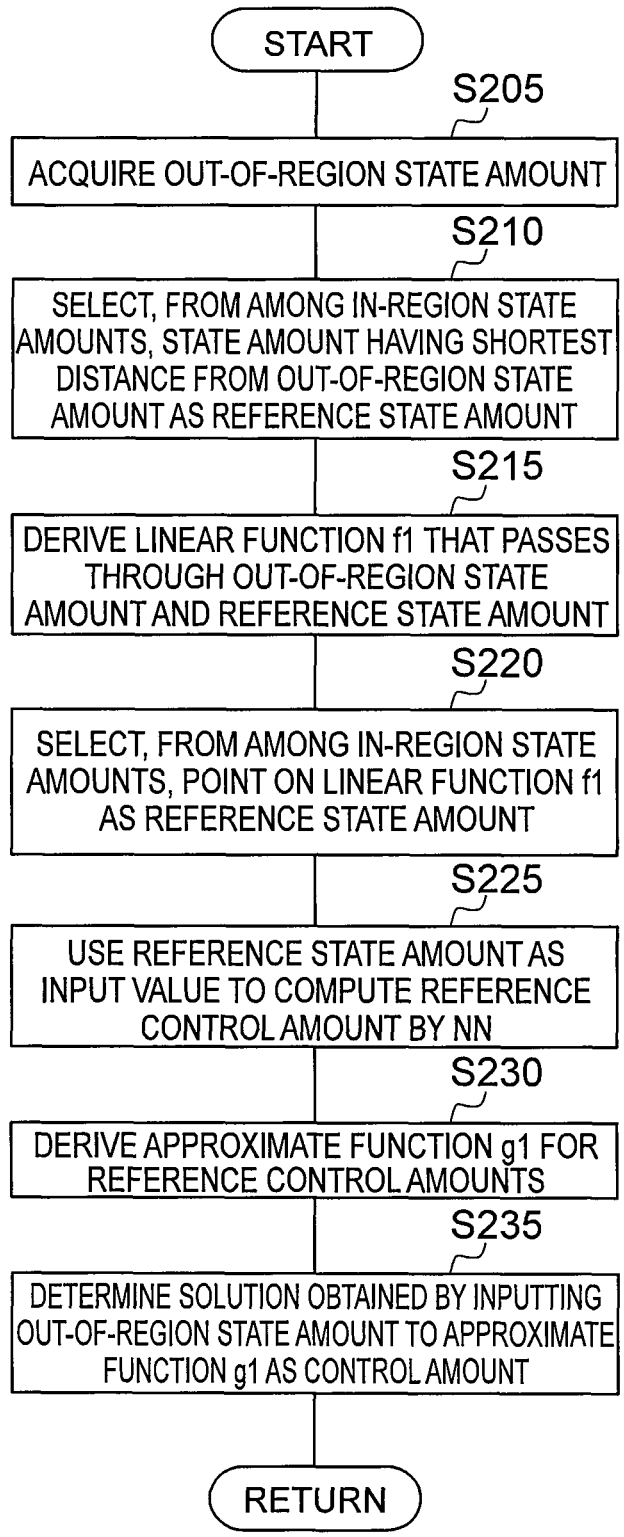
FIG. 7 is a flow chart for illustrating a control amount computation routine to be executed by a control device for an internal combustion engine according to a second embodiment.

Now, a specific description thereof is given with reference to the accompanying drawings. FIG. 7 is a flow chart for illustrating a control amount computation routine to be executed by the second computing unit 33 of the control device for the internal combustion engine according to the second embodiment. The routine illustrated in FIG. 7 is executed each time the region determiner 31 determines that the input state amount is an out-of-region state amount.

After starting the routine illustrated in FIG. 7, the second computing unit 33 sequentially executes the following processing from Step S205 to Step S235.

In Step S205, the second computing unit 33 acquires an out-of-region state amount.

In Step S210, the second computing unit 33 selects, from among the in-region state amounts, a state amount having the shortest distance from the out-of-region state amount as the reference state amount.

Figure 8:
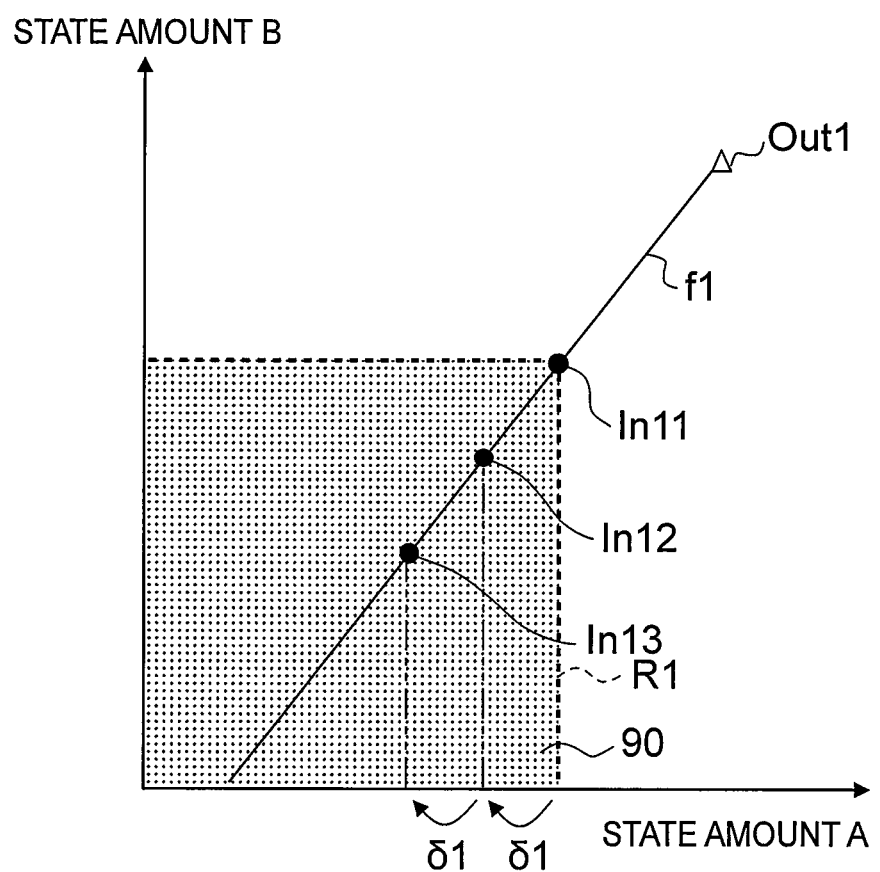
FIG. 8 is a graph for showing an operation of the control device for the internal combustion engine according to the second embodiment.

FIG. 8 is a graph for showing a method of selecting the reference state amount. The set region 90 shown in FIG. 8 is a region defined in the same manner as in the case of the set region 90 shown in FIG. 6. Therefore, in this case, the state amount having the shortest Euclidean distance Deu from the out-of-region state amount Out1 among the in-region state amounts is In11. Therefore, the second computing unit 33 selects In11 as the reference state amount.

In Step S215, the second computing unit 33 derives a linear function f1 that passes through the out-of-region state amount Out1 and the reference state amount In11.

In Step S220, the second computing unit 33 selects, from among the in-region state amounts, a point on the linear function f1 as the reference state amount. In this case, the second computing unit 33 selects, as a reference state amount In12, a state amount obtained when the reference state amount In11 is changed in a direction away from the out-of-region state amount Out1 along the linear function f1 by an amount corresponding to a change amount δ1 in the state amount A axis direction. The second computing unit 33 further selects, as a reference state amount In13, a state amount obtained when the reference state amount In12 is changed in the direction away from the out-of-region state amount Out1 along the linear function f1 by the amount corresponding to the change amount δ1 in the state amount A axis direction.

In Step S225, the second computing unit 33 uses the selected reference state amounts In11, In12, and In13 as input values to compute the reference control amounts by the NN 60.

Figure 9:
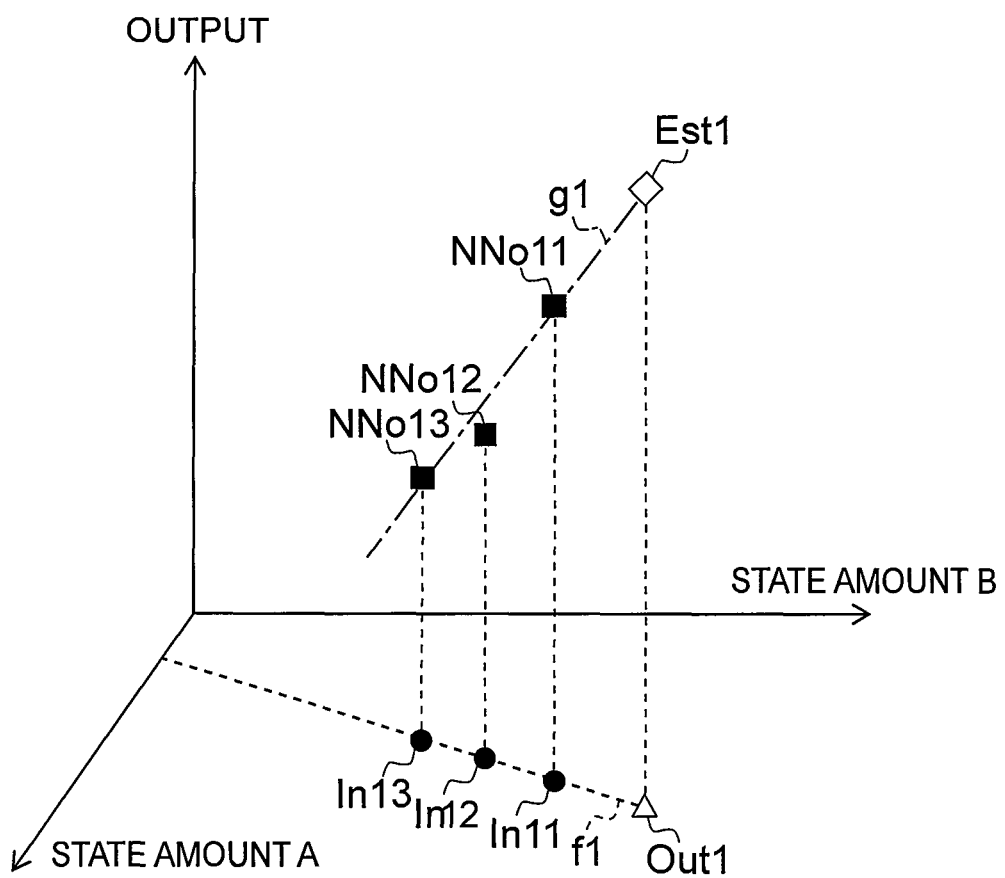
FIG. 9 is a graph for showing an operation of the control device for the internal combustion engine according to the second embodiment.

FIG. 9 is a graph for showing reference state amounts, their corresponding reference control amounts output from the NN 60, and an approximate function for the reference control amounts. As shown in FIG. 9, the second computing unit 33 inputs the reference state amount In11 to the NN 60, and determines, as the reference control amount, an amount NNo11 computed by the NN 60 and output from the NN 60. In the same manner, the second computing unit 33 inputs the reference state amounts In12 and In13 to the NN 60, and determines, as the reference control amounts, amounts NNo12 and NNo13 output from the NN 60, respectively.

In Step S230, the second computing unit 33 derives an approximate function g1 for the computed reference control amounts NNo11, NNo12, and NNo13. That is, the second computing unit 33 derives the approximate function g1 having the output from the NN 60 as a response variable and having the state amount A and the state amount B as explanatory variables. More specifically, the second computing unit 33 derives the approximate function g1 as a linear function expressed by Expression (3).

$$g1 = c0 + c1 \cdot A + c2 \cdot B \qquad (3)$$

In Expression (3), c0, c1, and c2 represent coefficients of the approximate function g1. "A" represents the value of state amount A, and B represents the value of state amount B. The second computing unit 33 obtains the approximate function g1 by calculating the coefficients c0, c1, and c2 using, for example, a least squares method.

In Step S235, the second computing unit 33 determines a solution Est1 obtained by inputting the out-of-region state amount Out1 to the approximate function g1 as the control amount corresponding to the out-of-region state amount Out1.

The reason for this processing is as follows. As described above, the control amount of the internal combustion engine generally has a non-linear relationship with the state amount, and hence the degree of change in control amount differs depending on the magnitude of the state amount. However, when the two state amounts are close to each other, a difference in degree of change between control amounts corresponding to the two state amounts tends to become relatively small. Therefore, the control amount corresponding to the out-of-region state amount is computed with high accuracy through use of the degree of change in control amount corresponding to the in-region state amount present in the neighborhood of the out-of-region state amount.

In such a control device for an internal combustion engine and such a control program therefor, the second computing unit 33 computes the linear function f1 that passes through the out-of-region state amount Out1 and the specific state amount In11 among the in-region state amounts. Subsequently, the second computing unit 33 selects, as the reference state amounts, the specific state amount In11 and the state amounts In12 and In13 on the linear function f1 other than the specific state amount.

The second computing unit 33 further uses the specific state amount In11 and the state amounts In12 and In13 on the linear function other than the specific state amount as input values to compute the reference control amounts NNo11, NNo12, and NNo13 by the NN 60. Then, the second computing unit 33 computes the approximate function g1 being the function for approximating the reference control amounts, and substitutes the out-of-region state amount Out1 into the approximate function g1, to thereby compute the control amount Est1 corresponding to the out-of-region state amount Out1. Therefore, even when the control amount corresponding to the out-of-region state amount Out1 is different from the control amount corresponding to the reference state amount, it is possible to suppress the deterioration in control accuracy of the internal combustion engine.

Third Embodiment

Next, a description is given of a control device for an internal combustion engine according to a third embodiment. In the control device for the internal combustion engine according to the third embodiment, the second computing unit 33 computes a plurality of linear functions, and computes a plurality of approximate functions. The second computing unit 33 further computes a plurality of reference control amounts, computes a plurality of control amounts corresponding to the out-of-region state amount, and statistically computes the computed plurality of control amounts. In this respect, the control device for the internal combustion engine according to the third embodiment is different from the control device for the internal combustion engine according to each of the first and second embodiments. Therefore, the following description is given mainly of the above-mentioned difference.

Figure 10:
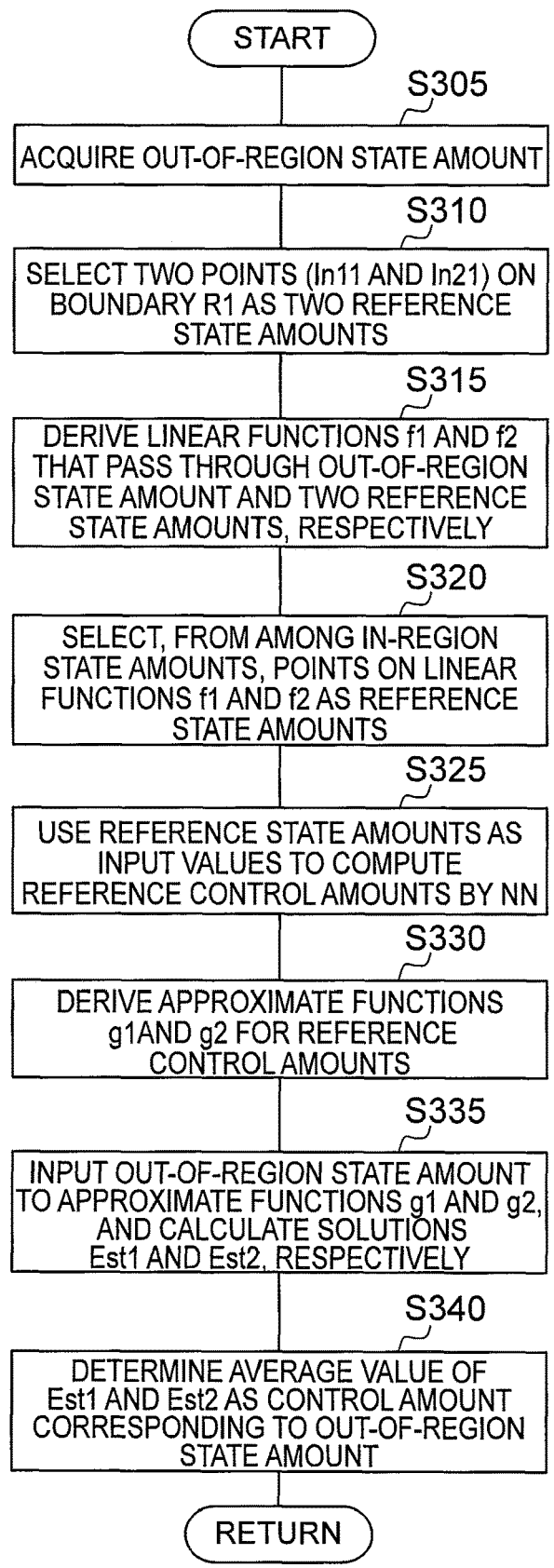
FIG. 10 is a flow chart for illustrating a control amount computation routine to be executed by a control device for an internal combustion engine according to a third embodiment.

FIG. 10 is a flow chart for illustrating a control amount computation routine to be executed by the second computing unit 33 of the control device for the internal combustion engine according to the third embodiment. The routine illustrated in FIG. 10 is executed each time the region determiner 31 determines that the input state amount is an out-of-region state amount.

After starting the routine illustrated in FIG. 10, the second computing unit 33 sequentially executes the following processing from Step S305 to Step S340.

In Step S305, the second computing unit 33 acquires an out-of-region state amount.

In Step S310, the second computing unit 33 selects two points In11 and In21 on the boundary R1 as two reference state amounts.

Figure 11:
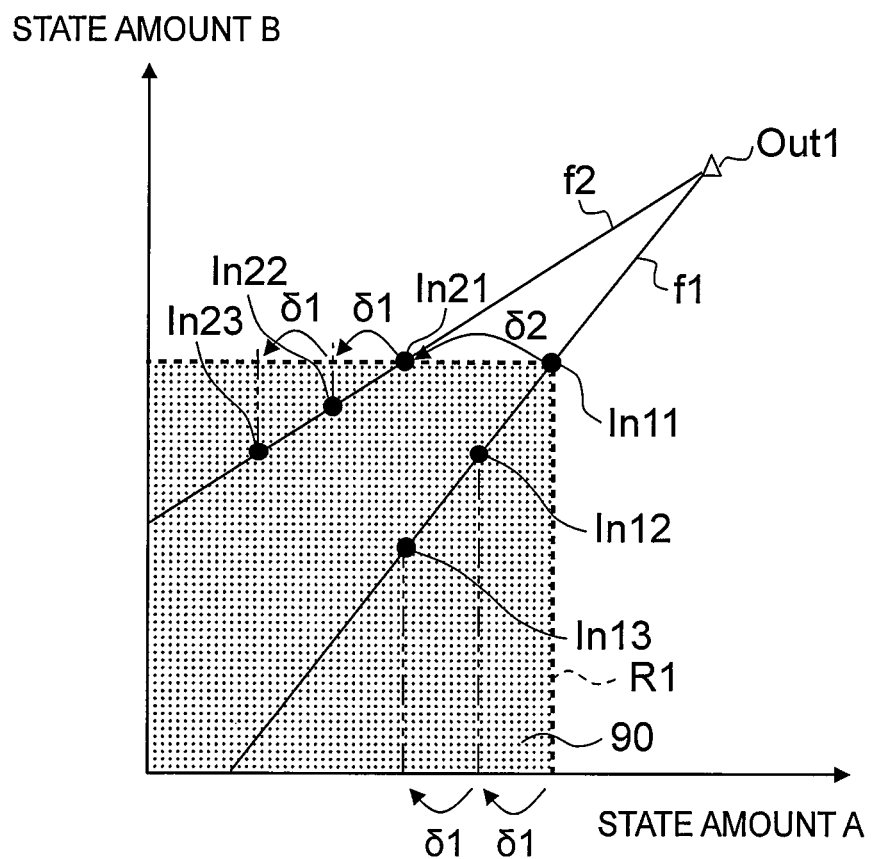
FIG. 11 is a graph for showing an operation of the control device for the internal combustion engine according to the third embodiment.

FIG. 11 is a graph for showing a method of selecting the reference state amount. The set region 90 shown in FIG. 11 is a region defined in the same manner as in the case of the set region 90 shown in FIG. 6. Therefore, in this case, the state amount having the shortest Euclidean distance Deu from the out-of-region state amount Out1 among the in-region state amounts is In11. Therefore, the second computing unit 33 selects In11 as the reference state amount.

In addition, the second computing unit 33 selects, as the other reference state amount In21, a state amount obtained when the selected reference state amount In11 is changed in a direction away from the out-of-region state amount Out1 along the boundary R1 by an amount corresponding to a change amount δ2 in the state amount A axis direction.

In Step S315, the second computing unit 33 derives linear functions f1 and f2 that pass through the out-of-region state amount and the two reference state amounts, respectively.

In Step S320, the second computing unit 33 selects, from among the in-region state amounts, a point on the linear functions f1 and f2 as the reference state amount.

In this case, the second computing unit 33 selects, as the reference state amount In12, a state amount obtained when the reference state amount In11 is changed in a direction away from the out-of-region state amount Out1 along the linear function f1 by the amount corresponding to the change amount δ1 in the state amount A axis direction. The second computing unit 33 further selects, as the reference state amount In13, a state amount obtained when the reference state amount In12 is changed in the direction away from the out-of-region state amount Out1 along the linear function f1 by the amount corresponding to the change amount δ1 in the state amount A axis direction.

The second computing unit 33 selects, as a reference state amount In22, a state amount obtained when the reference state amount In21 is changed in a direction away from the out-of-region state amount Out1 along the linear function f2 by the amount corresponding to the change amount δ1 in the state amount A axis direction. The second computing unit 33 further selects, as a reference state amount In23, a state amount obtained when the reference state amount In22 is changed in the direction away from the out-of-region state amount Out1 along the linear function f2 by the amount corresponding to the change amount δ1 in the state amount A axis direction.

In Step S325, the second computing unit 33 uses the selected reference state amounts In11, In12, In13, In21, In22, and In23 as input values to compute the reference control amounts by the NN 60.

Figure 12:
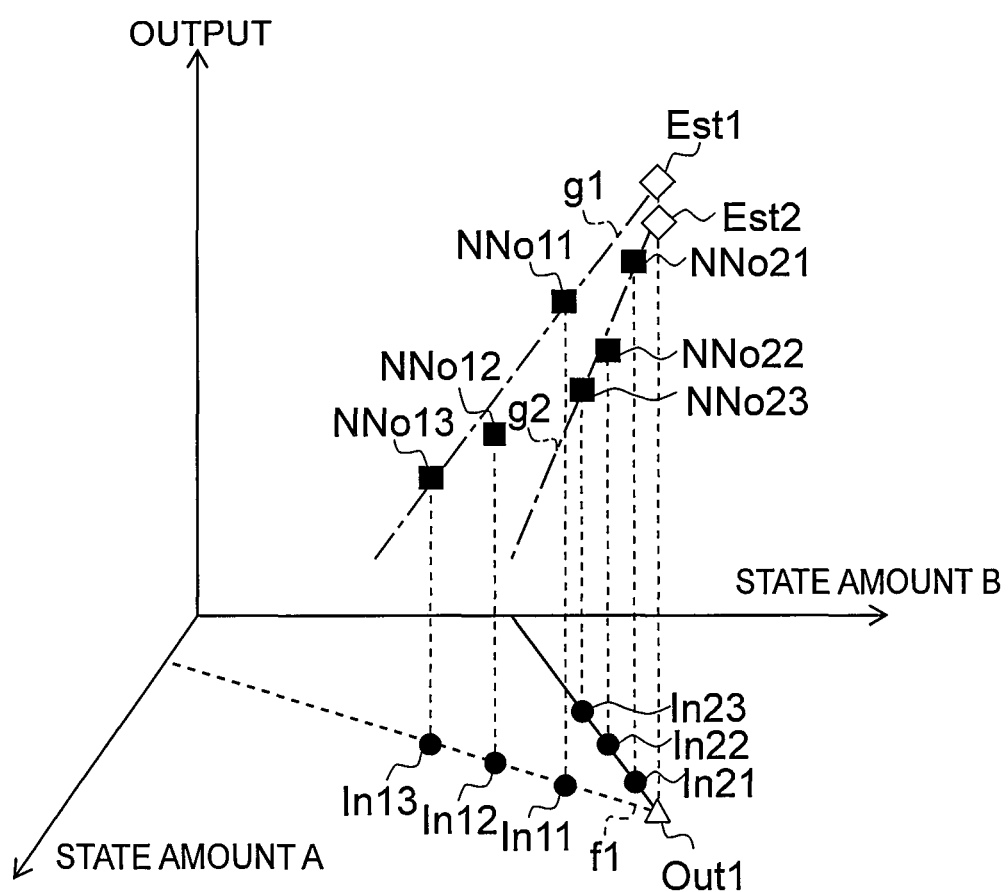
FIG. 12 a graph for showing an operation of the control device for the internal combustion engine according to the third embodiment.

FIG. 12 is a graph for showing reference state amounts, their corresponding reference control amounts output from the NN 60, and an approximate function for the reference control amounts. As shown in FIG. 12, the second computing unit 33 inputs the reference state amount In11 to the NN 60, and determines, as the reference control amount, the amount NNo11 computed by the NN 60 and output from the NN 60. In the same manner, the second computing unit 33 inputs the reference state amounts In12, In13, In21, In22, and In23 to the NN 60, and determines, as the reference control amounts, values NNo12, NNo13, NNo21, NNo22, and NNo23 output from the NN 60, respectively.

In Step S330, the second computing unit 33 derives each of the approximate function g1 for the computed reference control amounts NNo11, NNo12, and NNo13 and an approximate function g2 for the reference control amounts NNo21, NNo22, and NNo23, respectively. The second computing unit 33 derives the approximate functions g1 and g2 as linear functions having the output from the NN 60 as a response variable and having the state amount A and the state amount B as explanatory variables. The approximate functions g1 and g2 are functions expressed by Expression (3).

In Step S335, the second computing unit 33 inputs the out-of-region state amount Out1 to the approximate functions g1 and g2, and calculates the obtained solutions Est1 and Est2, respectively.

In Step S340, the second computing unit 33 determines an average value of the two solutions Est1 and Est2 as the control amount corresponding to the out-of-region state amount.

In such a control device for an internal combustion engine and such a control program therefor, the second computing unit 33 computes the plurality of linear functions f1 and f2, and computes the plurality of approximate functions g1 and g2. The second computing unit 33 further computes the plurality of reference control amounts, computes the plurality of control amounts Est1 and Est2 corresponding to the out-of-region state amount Out1, and statistically computes the computed plurality of control amounts Est1 and Est2. Therefore, even when the control amount corresponding to the out-of-region state amount Out1 is different from the control amount corresponding to the reference state amount, it is possible to further suppress the deterioration in control accuracy of the internal combustion engine.

In the third embodiment, the second computing unit 33 calculates the two approximate functions g1 and g2, and calculates the two solutions Est1 and Est2. However, the second computing unit 33 may calculate at least three approximate functions.

Further, in the third embodiment, the second computing unit 33 computes the control amount corresponding to the out-of-region state amount Out1 by averaging the two calculated solutions Est1 and Est2. However, the second computing unit 33 may compute the control amount corresponding to the out-of-region state amount Out1 by statistical processing for maximum values, minimum values, weighted averages, and other such values of the two solutions Est1 and Est2.

Further, in the third embodiment, the change amount δ2 is set as the change amount in the state amount A axis direction, but may be set as a change amount in the state amount B axis direction. In other words, the change amount δ2 may be set as a change amount in any axis direction of the n-dimensional space.

Further, in the second and third embodiments, the change amounts δ1 and δ2 may be fixed values, or may be variables corresponding to the magnitude of the out-of-region state amount Out1 and the magnitude of the Euclidean distance Deu. It suffices that the change amount δ1 is adjusted in accordance with a target computation accuracy.

Further, in the second and third embodiments, the change amount δ1 is the change amount in the state amount A axis direction, but may be a change amount in the state amount B axis direction. In other words, the change amount δ1 may be a change amount in any axis direction of the n-dimensional space.

Further, in the second and third embodiments, three reference state amounts are selected on one linear function, but it suffices that at least two points are selected.

Further, in the first to third embodiments, the reference state amount is selected as the state amount that minimizes the Euclidean distance Deu among the in-region state amounts. However, the reference state amount may be set in advance by a lookup table corresponding to the position of the out-of-region state amount in the n-dimensional space.

Further, in the first to third embodiments, the reference small range, the horizontal width w1, and the vertical width w2 are set to the fixed values, but may be values corresponding to the magnitudes of the state amount A and the state amount B.

The control amount is computed for the value of the state amount that falls out of the set region 90 in the two-dimensional space having the coordinate axes representing the two parameters of the state amount A and the state amount B. However, when n state amounts are used as parameters to be input to the NN 60, the control amount may be computed by the same method in the n-dimensional space.

The method of setting the set region is not limited to the above-mentioned method. For example, the set region may be set by the following procedure.
(1) The learning device causes the NN 60 to perform learning through use of all the provided pieces of training data.
(2) The learning device inputs the training input data to the NN 60 that has undergone the learning, and calculates the computation accuracy of the NN 60 through use of the data output from the NN 60 and the training output data.
(3) The learning device sets, as the set region, a range of the training input data in which the calculated computation accuracy satisfies the target computation accuracy.

When it is determined that it is not required to limit the range of one of a plurality of state amounts as a result of collecting pieces of training data that cover the entire operation region to be actually used for the one state amount, the one state amount may be omitted from the parameters for the set region. With this omission, the setting of the set region 90 is simplified, and a computation load on the learning device is reduced.

The configuration of the neural network to be used by the computing unit 30 is not limited to the above-mentioned configuration. The computing unit 30 may use, for example, a convolutional neural network or a recurrent neural network. In addition, the learning method of the neural network is not limited to the above-mentioned learning method.

Figure 13:
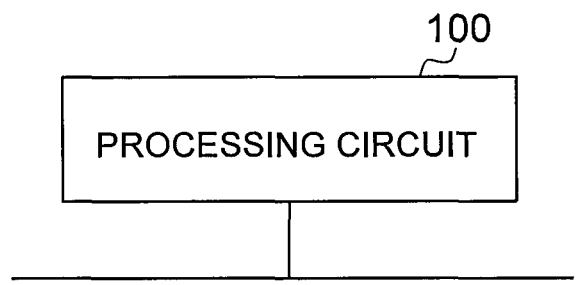
FIG. 13 is a configuration diagram for illustrating a first example of a processing circuit configured to implement each function of the control device for the internal combustion engine according to each of the first to third embodiments.

Each function of the control device 10 for the internal combustion engine according to each of the first to third embodiments is implemented by a processing circuit. FIG. 13 is a configuration diagram for illustrating a first example of a processing circuit configured to implement each function of the control device 10 for the internal combustion engine according to each of the first to third embodiments. A processing circuit 100 in the first example is formed of dedicated hardware.

Further, the processing circuit 100 corresponds to, for example, a single circuit, a complex circuit, a programmed processor, a processor for a parallel program, an application specific integrated circuit (ASIC), a field programmable gate array (FPGA), or a combination thereof. Further, each function of the control device 10 may be implemented by individual processing circuits 100, or each function may altogether be implemented by the processing circuit 100.

Figure 14:
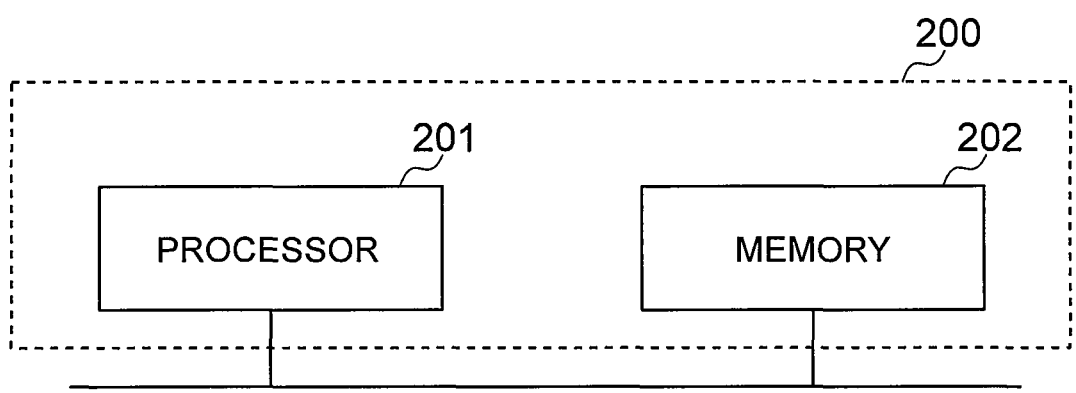
FIG. 14 is a configuration diagram for illustrating a second example of a processing circuit configured to implement each function of the control device for the internal combustion engine according to each of the first to third embodiments.

FIG. 14 is a configuration diagram for illustrating a second example of a processing circuit configured to implement each function of the control device 10 for the internal combustion engine according to each of the first to third embodiments. A processing circuit 200 in the second example includes a processor 201 and a memory 202.

In the processing circuit 200, each function of the control device 10 for the internal combustion engine is implemented by software, firmware, or a combination of software and firmware. The software and the firmware are described as programs, and are stored in the memory 202. The processor 201 reads out and executes the programs stored in the memory 202, to thereby implement each function of the control device 10.

It can also be described that the program stored in the memory 202 causes the computer to execute the procedure or method for each component described above. In this case, the memory 202 is a non-volatile or volatile semiconductor memory, for example, a random access memory (RAM), a read only memory (ROM), a flash memory, an erasable programmable read only memory (EPROM), or an electrically erasable and programmable read only memory (EEPROM). Other examples of the memory 202 include a magnetic disk, a flexible disk, an optical disc, a compact disc, a MiniDisk, and a DVD.

The above-mentioned function of each component may be implemented partially by dedicated hardware, and partially by software or firmware.

In this way, the processing circuit can implement the above-mentioned function of each component by hardware, software, firmware, or a combination thereof.

What is claimed is:

1. A control device for an internal combustion engine, the control device comprising:
an information acquirer configured to acquire, from a state amount sensor, information on a state amount that changes depending on an operation state of the internal combustion engine; and
a computing unit configured to compute at least one control amount for controlling the internal combustion engine based on the information acquired by the information acquirer,
the computing unit including:
a region determiner configured to determine whether the state amount falls within a set region;
a first computing unit configured to use at least one in-region state amount, which is the state amount determined to fall within the set region, as an input value to compute the at least one control amount by a neural network; and
a second computing unit configured to use at least one out-of-region state amount, which is the state amount determined to fall out of the set region, as an input value to compute the at least one control amount, and
the second computing unit being configured to:
select at least one reference state amount, which is the state amount that falls within the set region, based on the at least one out-of-region state amount;
use the at least one reference state amount as an input value to compute at least one reference control amount by the neural network; and
compute the at least one control amount corresponding to the at least one out-of-region state amount based on the at least one reference control amount.

2. The control device for the internal combustion engine according to claim 1, wherein the second computing unit is configured to select the state amount closest to the at least one out-of-region state amount as the at least one reference state amount.

3. The control device for the internal combustion engine according to claim 2,
wherein the at least one in-region state amount includes a plurality of in-region state amounts and
wherein the second computing unit is configured to select, from among the plurality of in-region state amounts, a state amount having a shortest distance from the at least one out-of-region state amount as the at least one reference state amount in an n-dimensional space having coordinate axes each representing the state amount.

4. The control device for the internal combustion engine according to claim 3, wherein the second computing unit is configured to output the at least one reference control amount directly as the at least one control amount corresponding to the at least one out-of-region state amount.

5. The control device for the internal combustion engine according to claim 3,
wherein the at least one in-region state amount includes a plurality of in-region state amounts and
wherein the second computing unit is configured to:
compute at least one linear function that passes through the at least one out-of-region state amount and a specific state amount among the plurality of in-region state amounts;
select, as the at least one reference state amount, the specific state amount and a state amount on the at least one linear function other than the specific state amount;
use the specific state amount and the state amount on the at least one linear function other than the specific state amount as input values to compute the at least one reference control amount by the neural network; and
compute at least one approximate function being a function for approximating the at least one reference control amount, and substitute the at least one out-of-region state amount into the at least one approximate function, to thereby compute the at least one control amount corresponding to the at least one out-of-region state amount.

6. The control device for the internal combustion engine according to claim 2, wherein the second computing unit is configured to output the at least one reference control amount directly as the at least one control amount corresponding to the at least one out-of-region state amount.

7. The control device for the internal combustion engine according to claim 2,
wherein the at least one in-region state amount includes a plurality of in-region state amounts and
wherein the second computing unit is configured to:
compute at least one linear function that passes through the at least one out-of-region state amount and a specific state amount among the plurality of in-region state amounts;
select, as the at least one reference state amount, the specific state amount and a state amount on the at least one linear function other than the specific state amount;
use the specific state amount and the state amount on the at least one linear function other than the specific state amount as input values to compute the at least one reference control amount by the neural network; and compute at least one approximate function being a function for approximating the at least one reference control amount, and substitute the at least one out-of-region state amount into the at least one approximate function, to thereby compute the at least one control amount corresponding to the at least one out-of-region state amount.

8. The control device for the internal combustion engine according to claim 1, wherein the second computing unit is configured to output the at least one reference control amount directly as the at least one control amount corresponding to the at least one out-of-region state amount.

9. The control device for the internal combustion engine according to claim 1,
wherein the at least one in-region state amount includes a plurality of in-region state amounts and
wherein the second computing unit is configured to:
compute at least one linear function that passes through the at least one out-of-region state amount and a specific state amount among the plurality of in-region state amounts;
select, as the at least one reference state amount, the specific state amount and a state amount on the at least one linear function other than the specific state amount;
use the specific state amount and the state amount on the at least one linear function other than the specific state amount as input values to compute the at least one reference control amount by the neural network; and
compute at least one approximate function being a function for approximating the at least one reference control amount, and substitute the at least one out-of-region state amount into the at least one approximate function, to thereby compute the at least one control amount corresponding to the at least one out-of-region state amount.

10. The control device for the internal combustion engine according to claim 9,
wherein the at least one linear function includes a plurality of linear functions; the at least one approximate function includes a plurality of approximate functions; the at least one reference control amount includes a plurality of reference control amounts; and the at least one control amount includes a plurality of control amounts and
wherein the second computing unit is configured to compute the plurality of linear functions, compute the plurality of approximate functions, compute the plurality of reference control amounts, compute the plurality of control amounts corresponding to the at least one out-of-region state amount, and statistically compute the computed plurality of control amounts.

11. The control device for the internal combustion engine according to claim 1, wherein the set region is set as a region in which a density of presence of training input data to be used for learning by the neural network is equal to or higher than a reference density in an n-dimensional space having coordinate axes each representing the state amount.

12. A control program for an internal combustion engine, which is executed by a computer to perform:
information acquisition processing of acquiring, from a state amount sensor, information on a state amount that changes depending on an operation state of the internal combustion engine; and
computation processing of computing a control amount for controlling the internal combustion engine based on the information acquired by the information acquisition processing,
the computation processing including:
region determination processing of determining whether the state amount falls within a set region;
first computation processing of using an in-region state amount, which is the state amount determined to fall within the set region, as an input value to compute the control amount by a neural network; and
second computation processing of using an out-of-region state amount, which is the state amount determined to fall out of the set region, as an input value to compute the control amount, and
the second computation processing including processing of:
selecting a reference state amount, which is the state amount that falls within the set region, based on the out-of-region state amount;
using the reference state amount as an input value to compute a reference control amount by the neural network; and
computing the control amount corresponding to the out-of-region state amount based on the reference control amount.

\* \* \* \* \*